(12) United States Patent
Snyder

(10) Patent No.: US 8,880,453 B2
(45) Date of Patent: Nov. 4, 2014

(54) METHOD OF PATTERN RECOGNITION FOR ARTIFICIAL INTELLIGENCE

(76) Inventor: Steven Howard Snyder, Southfield, MI (US)

( * ) Notice: Subject to any disclaimer, the term of this patent is extended or adjusted under 35 U.S.C. 154(b) by 175 days.

(21) Appl. No.: 13/563,843

(22) Filed: Aug. 1, 2012

(65) Prior Publication Data

US 2013/0054504 A1 Feb. 28, 2013

Related U.S. Application Data

(60) Provisional application No. 61/528,413, filed on Aug. 29, 2011.

(51) Int. Cl.
*G06F 17/00* (2006.01)
*G06N 5/02* (2006.01)
*G06K 9/00* (2006.01)
*G06F 7/60* (2006.01)
*G06F 7/02* (2006.01)
*G06F 7/501* (2006.01)

(52) U.S. Cl.
CPC .............. *G06F 7/02* (2013.01); *G06K 9/00986* (2013.01); *G06F 7/607* (2013.01); *G06F 7/5013* (2013.01)
USPC .......................................................... 706/46

(58) Field of Classification Search
USPC ............................................................ 706/46
See application file for complete search history.

(56) References Cited

U.S. PATENT DOCUMENTS

2008/0185919 A1* 8/2008 Snyder ........................... 307/149
2013/0054504 A1* 2/2013 Snyder ............................. 706/46
2013/0146789 A1* 6/2013 Snyder ........................ 250/492.1

\* cited by examiner

*Primary Examiner* — Michael B Holmes

(57) ABSTRACT

Invention for pattern recognition and artificial intelligence comprising:
1) storing data in parallel by applying a logic level (1) input or a logic level (0) input to one input of each of at least two exclusive-nor logic gates;
2) comparing data in parallel by applying a logic level (1) input or a logic level (0) input to the other input of each of the exclusive-nor gates, wherein each exclusive-nor gate produces a logic level (1) output when both inputs have the same datum input, and each exclusive-nor gate produces a logic level (0) output when both inputs have different datum input; and
3) measuring the outputs of the exclusive-nor logic gates collectively with a measuring apparatus, wherein the percentage of the pattern input for comparison which matches the pattern of data stored in the exclusive-nor gates is directly proportional to the magnitude of the collective output of the exclusive-nor gates.

1 Claim, 11 Drawing Sheets

METHOD OF PATTERN RECOGNITION FOR ARTIFICIAL INTELLIGENCE

BACKGROUND OF THE INVENTION

1. Field of the Invention

In general, the present invention pertains to methods of parallel processing. More specifically, the present invention pertains to methods of pattern recognition including, in particular, methods of pattern recognition for artificial intelligence.

2. Prior Art of the Invention

Prior art pertinent to the present invention includes methods of processing data for pattern recognition. More specifically in the pertinent prior art, conventional computers typically apply hardware and software in a serial process which implements one or more microprocessors and instruction set architecture for pattern recognition. Such methods of pattern recognition disadvantageously limit the performance of the processing of data due to machine cycles which consume fetch and execution times, and consequentially cause a bottleneck. In effect, compute-intensive applications, which include certain pattern recognition applications, perform ineffectively.

The present invention applies a method of pattern recognition that applies an array of interconnected exclusive-nor logic gates which on their own provide a sufficient amount of information for quickly determining the extent to which a pattern of input data matches a pattern of stored data. In result, the method of the present invention compares patterns with a greater performance than the prior art. Then, on a higher level, the present invention provides a high performance method of pattern recognition which is applicable for artificial intelligence.

SUMMARY OF THE INVENTION

In general, the present invention is applied for pattern recognition as follows:

Step 1) Storing a pattern of data by applying an electrical input including the presence of electrical input, e.g., a binary logic level (1) input, or absence of electrical input, e.g., a binary logic level (0) input, to one input of each of at least two exclusive-nor logic gates. Wherein, a pattern of data is stored in parallel;

Step 2) Comparing an input pattern of data with the stored pattern of data by applying an electrical input including the presence of electrical input, e.g., a binary logic level (1) input, or absence of electrical input, e.g., a binary logic level (0) input, to the other input of each of the exclusive-nor gates. Wherein, each exclusive-nor gate produces electrical output when both inputs have the same datum input, i.e., both inputs have the presence or both inputs have the absence of electrical input, i.e., both inputs have a binary logic level (1) input or both inputs have a binary logic level (0) input; and each exclusive-nor gate does not produce electrical output, e.g., produces a binary logic level (0) output, when both inputs have a different datum input, i.e., one input has the presence of electrical input and the other input has the absence of electrical input, i.e., one input has a binary logic level (1) input and the other input has a binary logic level (0) input. Wherein, in effect, patterns of data are compared in parallel; and Step 3) Measuring the outputs of the exclusive-nor gates collectively with a measuring apparatus. Wherein, the percentage of the pattern which is input for comparison which matches the pattern of data stored in the exclusive-nor gates is directly proportional to the magnitude of the collective output of the exclusive-nor gates, and is indicated by the measuring apparatus.

One simple example of a preferred embodiment of the present invention for pattern recognition applies a method in which the current outputs of a one-dimensional array of exclusive-nor gates are input into a current summer apparatus, e.g., a simple parallel circuit, such that the currents summate, and then the summated current output is measured with a current measuring apparatus (e.g., an ammeter).

Another preferred embodiment of the present invention is applied for a digitally-based method of pattern recognition in which the outputs of a plurality of one-dimensional arrays of exclusive-nor gates are digitally gated, and a measuring apparatus competitively measures the pulses which are output from each array of digitally-gated exclusive-nor gates in order to determine which stored pattern best matches the pattern input for comparison. Wherein, the array of exclusive-nor gates which best matches the pattern of data input for comparison consequentially applies input to a target apparatus in order to produce a result, e.g., in order to actuate the target.

Another preferred embodiment of the present invention which is applied for patter recognition is equivalent to the preferred embodiment of the present invention which pertains to the digitally-based method of pattern recognition mentioned hereinbefore except for the application of apparatus which can prevent a certain sort of error from occurring when certain apparatus, e.g., a few exclusive-nor gates, are dysfunctional, and when the difference between matching data patterns is significantly small amongst memory units compared to the number of dysfunctional apparatus associated with the memory unit with the most matching data.

Another preferred embodiment of the present invention which is applied for pattern recognition applies a version of the digitally-based method of pattern recognition mentioned hereinbefore, but is a different by requiring a certain threshold amount of pattern matching before a targeted result can be produced.

Another simple example of a preferred embodiment of the present invention for pattern recognition applies a method in which the outputs of a one-dimensional array of exclusive-nor gates are input into an apparatus such as the following: a) a digital-to-analog converter, i.e., a voltage summer circuit, which produces an analog voltage output from the digital voltage inputs applied by the exclusive-nor gates; or b) an apparatus which comprises a current summer apparatus, e.g., a simple parallel circuit, which summates the current inputs from the exclusive-nor gates, and then converts the summated current output into an analog voltage using a current to voltage converter. Wherein, in either case, the analog voltage output is then measured with a voltage measuring apparatus (e.g., a voltmeter).

Another preferred embodiment of the present invention which is applied for pattern recognition applies a plurality of one-dimensional arrays of exclusive-nor gates with outputs which are competitively measured by measuring apparatus comprising the quantizers of flash analog-to-digital converters in order to determine which stored pattern best matches the pattern input for comparison.

Another preferred embodiment of the present invention is applied for a combination-based method of pattern recognition with the application of two pattern recognition apparatus which each apply a process which is equivalent to the digitally-based method of pattern recognition mentioned hereinbefore except for some respective modifications which are made in conjunction with the addition of a third apparatus which applies a combination-based process of pattern recognition for storing and comparing combinations of patterns of data.

Another preferred embodiment of the present invention is applied for a sequence-based method of pattern recognition with the application of a version of the digitally-based methods of pattern recognition mentioned hereinbefore except for some respective modifications which are made in conjunction with the addition of another apparatus which applies a sequence-based process of pattern recognition for comparing sequences of patterns of data.

Yet another preferred embodiment of the present invention which is applied for pattern recognition applies a version of the digitally-based methods of pattern recognition mentioned hereinbefore except for some respective modifications which are made in conjunction with the addition of steps for modifying the values of one or more of the parameters of a pattern input for comparison in terms of, for example, size, position, and/or rotation in order to compare an input pattern with stored patterns when the values of one or more of the parameters of the pattern input for comparison vary relative to an otherwise matching stored pattern in terms of, as in this example, size, position, and/or rotation.

Still yet another preferred embodiment of the present invention which is applied for pattern recognition applies a version of the digitally-based methods of pattern recognition mentioned hereinbefore except for some respective modifications which are made in conjunction with the addition of steps for modifying the values of one or more of the parameters of, in this case, the stored patterns, in terms of, for example, size, position, and/or rotation in order to compare an input pattern with the stored patterns when the values of one or more of the parameters of the pattern input for comparison vary relative to an otherwise matching stored pattern in terms of, as in this example, size, position, and/or rotation.

Even still yet another preferred embodiment of the present invention applies a two-dimensional array of interconnected exclusive-nor gates for pattern recognition.

While still yet even other preferred embodiments of the present invention which are applied for pattern recognition propose to apply a version of the digitally-based methods of pattern recognition mentioned hereinbefore for interfacing with, and providing pattern recognition for, neurological tissue (e.g., for replacing or augmenting brain tissue; for providing a spinal cord bridge; or for interfacing neurological tissue with the external environment).

BRIEF DESCRIPTION OF THE DRAWINGS

FIG. (1a) is a schematic view of a first preferred embodiment of the present invention which is applied for pattern recognition which applies a one-dimensional array of exclusive-nor logic gates with outputs which are collectively measured by a measuring apparatus in a basic pattern recognition process.

Figure 1A:
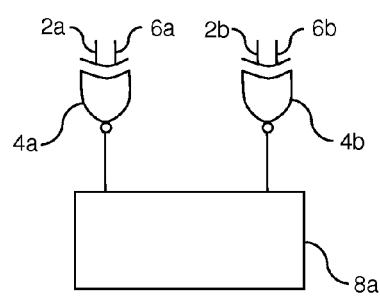
(FIG. 1b) is a schematic view of one simple example of a preferred embodiment of the present invention which is applicable for pattern recognition which applies a method in which the current outputs of a one-dimensional array of exclusive-nor gates are input into a current summer apparatus, e.g., a simple parallel circuit, such that the summated currents summate, and then the current output is measured with a current measuring apparatus (e.g., an ammeter).
Figure 1B:
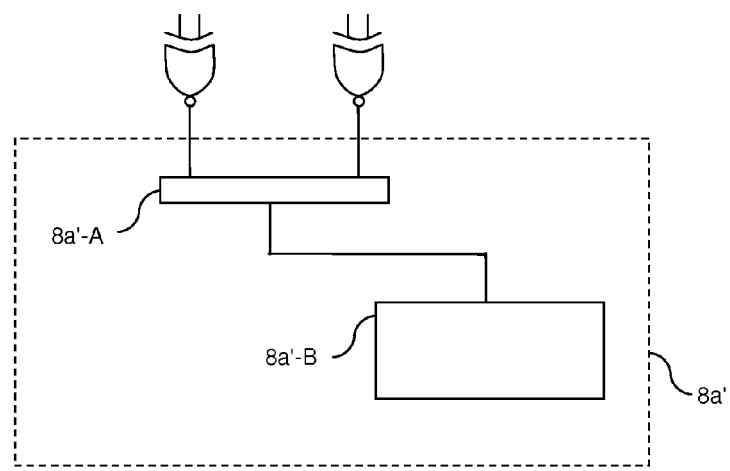

FIG. (2a) is a schematic view of a preferred embodiment of the present invention which is applied for pattern recognition which is different by applying a digitally-based method of pattern recognition in which the outputs of a plurality of one-dimensional arrays of exclusive-nor gates are digitally gated, and then measuring apparatus comprising shift registers competitively measures the pulses which are output from each array of digitally-gated exclusive-nor gates in order to determine which stored pattern best matches the pattern input for comparison. Wherein, the array of exclusive-nor gates which best matches the pattern of data input for comparison consequentially applies input to a target apparatus in order to produce a result, e.g., in order to actuate the target.

FIG. (2a') is a schematic view of a preferred embodiment of the present invention which is applied for pattern recognition which is equivalent to the preferred embodiment of the present invention which is illustrated in FIG. (2a) except for the application of apparatus (47) (outlined in dashed line format) which can prevent a certain sort of error from occurring when certain apparatus, e.g., a few exclusive-nor gates, are dysfunctional, and when the difference between matching data patterns is significantly small amongst memory units compared to the number of dysfunctional apparatus associated with the memory unit with the most matching data.

FIG. (2b) is a schematic view of a preferred embodiment of the present invention which is applied for pattern recognition which applies a version of the digitally-based method of pattern recognition mentioned hereinbefore, but is different by requiring a certain threshold amount of pattern matching, which is controlled by threshold counters, before producing a targeted result.

FIG. (2c) is a schematic view of another simple example of a preferred embodiment of the present invention which is applicable for pattern recognition, and is different by applying a method in which the voltage or current outputs of a one-dimensional array of exclusive-nor gates are input into an apparatus which produces an analog voltage output which is then measured with a voltage measuring apparatus (e.g., a voltmeter).

FIG. (2c') is a schematic view of a more specific version of the preferred embodiment of the present invention for pattern recognition which is illustrated in FIG. (2c), and is different by applying a plurality of one-dimensional arrays of exclusive-nor gates with outputs which are respectively converted to analog voltage outputs which are then competitively measured by a measuring process, which includes the quantization processes of flash analog-to-digital converters, in order to determine which stored pattern best matches the pattern input for comparison.

FIGS. (3A), (3B), and (3C) are schematic views which together illustrate a preferred embodiment of the present invention which is applied for a combination-based method of pattern recognition which is different by applying two pattern recognition apparatus which each apply a process which is equivalent to the digitally-based method of pattern recognition which pertains to FIG. (2a) except for some respective modifications which are made in conjunction with the addition of a third apparatus for storing and comparing combinations of patterns of data.

FIGS. (4A) and (4B) are schematic views which together illustrate a preferred embodiment of the present invention which is applied for a sequence-based method of pattern recognition which is different by applying a version of the digitally-based methods of pattern recognition mentioned hereinbefore except for some respective modifications which are made in conjunction with the addition of apparatus for storing and comparing sequences of patterns of data. de

DETAILED DESCRIPTION OF THE INVENTION

FIG. (1a) is a schematic view of a first preferred embodiment of the present invention which is applied for a basic pattern recognition process, and comprises the following steps:

1) Storing a pattern of data by applying an electrical input, e.g., a binary logic level (1) input, or the absence of electrical input, e.g., a binary logic level (0) input, to inputs (2a) and (2b) comprised by exclusive-nor logic gates (4a) and (4b). Wherein, a pattern of data is stored in parallel;

2) Comparing an input pattern of data with the stored pattern of data by applying an electrical input, e.g., a binary logic level (1) input, or the absence of electrical input, e.g., a binary logic level (0) input, to inputs (6a) and (6b) comprised by exclusive-nor gates (4a) and (4b), such that exclusive-nor gates (4a) and (4b) each produce an electrical output, e.g., a binary logic level (1) output, or the absence of electrical output, e.g., a binary logic level (0) output, according to the logic of their respective inputs. In which case, each exclusive-nor gate produces electrical output when both of its inputs have the same datum input, i.e., both inputs have the presence or both inputs have the absence of electrical input, e.g., both inputs have a binary logic level (1) input or both inputs have a binary logic level (0) input; and each exclusive-nor gate does not produce electrical output, e.g., produces a binary logic level (0) output, when both of its inputs have a different datum input, i.e., one input has the presence of electrical input and the other input has the absence of electrical input, e.g., one input has a binary logic level (1) input and the other input has a binary logic level (0) input. Wherein, in effect, patterns of data are compared in parallel; and 3) Measuring the outputs produced by exclusive-nor gates (4a) and (4b) collectively with measuring apparatus (8a). Wherein, the percentage of the pattern input for comparison which matches the pattern of data stored in exclusive-nor gates (4a) and (4b) is directly proportional to the magnitude of the collective output of exclusive-nor gates (4a) and (4b), and is indicated by measuring apparatus (8a). (Note, refer to the notes at the end of this detailed description of present invention for the clarification of certain terms applied herein.)

FIG. (1b) is a schematic view of one simple example of the preferred embodiment illustrated in FIG. (1a), and especially illustrates measuring apparatus (8a') (outlined in dashed line format) which is one version of measuring apparatus (8a) which is illustrated in FIG. (1a). Wherein, the preferred embodiment illustrated in FIG. (1b) applies a method in which the current outputs of a one-dimensional array of exclusive-nor logic gates are input into current summer apparatus (8a'-A), e.g., a simple parallel circuit, which summates the currents, and then the summated current output is measured with current measuring apparatus (8a'-B) (e.g., an ammeter).

FIG. (2a) is a schematic view of another preferred embodiment of the present invention which is applied for pattern recognition. Wherein, the preferred embodiment illustrated in FIG. (2a) is different in that the preferred embodiment which is illustrated in FIG. (2a) more specifically applies a digitally-based method of pattern recognition in which a pattern of data is input for comparison in a competitive manner with a plurality of patterns of data which are respectively stored in a plurality of memory units which each comprise a one-dimensional array of interconnected exclusive-nor logic gates.

The digitally-based pattern recognition process illustrated in FIG. (2a), which comprises apparatus (12c), operates as follows:

In the storage stage of the pattern recognition process, the following occurs:

1a) In FIG. (2a), two different patterns of data are respectively input in parallel into memory units (10c) and (10g) by applying an electrical input, e.g., a binary logic level (1) input, or the absence of electrical input, i.e., a binary logic level (0) input, to the data input comprised by each of the storage latches (14c) and (14e) comprised in a memory unit (10c) for one pattern input, and by applying an electrical input, i.e., a binary logic level (1) input, or the absence of electrical input, i.e., a binary logic level (0) input to the data input comprised by each of the storage latches (14g) and (14k) comprised in memory unit (10g) for the other pattern input (wherein the storage latches are, for example, D-latches, and each latch corresponds to a spatial position);

1b) As master clock (16c) clocks timer (18c), timer (18c) is set;

1c) Then, timer (18c) applies a binary logic level (1) input to the clock input of each of the storage latches (14c), (14e), (14g), and (14k); and 1d) Consequentially, latches (14c), (14e), (14g), and (14k) each input the respective datum into one input of a respectively connected exclusive-nor gate comprising exclusive-nor gates (4c), (4f), (4g), and (4m), respectively, by applying an electrical input, i.e., a binary logic level (1) input, or the absence of electrical input, i.e., a binary logic level (0) input. Wherein, data is stored in parallel.

Next, in the comparison stage of the digitally-based pattern recognition process, the following occurs:

2a) In FIG. (2a), two equivalent patterns of data for comparison are respectively input in parallel into memory units (10c) and (10g) by applying an electrical input, i.e., a binary logic level (1) input, or the absence of electrical input, i.e., a binary logic level (0) input, to the data input comprised by each of the comparison latches (14d) and (14f) comprised in memory unit (10c) for one pattern input, and by applying an electrical input, i.e., a binary logic level (1) input, or the absence of electrical input, i.e., a binary logic level (0) input to the data input comprised by each of the comparison latches (14h) and (14m) comprised in memory unit (10g) for the other (equivalent) pattern input;

2b) As master clock (16c) clocks timer (20c), timer (20c) is set;

2c) Then, timer (20c) applies a binary logic level (1) input to the clock input of each of the comparison latches (14d), (14f), (14h), and (14m);

2d) Consequentially, latches (14d), (14f), (14h), and (14m) each input the respective datum into the other input of a respectively connected exclusive-nor gate, comprising exclusive-nor gates (4c), (4f), (4g), and (4m), respectively (Note that each comparison latch corresponds to the same spatial position as the spatial position of the storage latch which is connected to the same exclusive-nor gate.);

2e) Then, exclusive-nor gates (4c), (4f), (4g), and (4m) each produce an electrical output or the absence of electrical output depending upon their respective logic. Wherein, each exclusive-nor gate produces electrical output when both of its inputs have the same datum input, i.e., both inputs have the presence or both inputs have the absence of electrical input, i.e., both inputs have a binary logic level (1) input or both inputs have a binary logic level (0) input; and each exclusive-nor gate does not produce electrical output, i.e., produces a binary logic level (0) output, when both of its inputs have different datum input, i.e., one input has the presence of electrical input and the other input has the absence of electrical input, i.e., one input has a binary logic level (1) input and the other input has a binary logic level (0) input;

2f) Then, exclusive-nor gates (4c), (4f), (4g), and (4m) each apply an input, e.g., a binary logic level (1) input, or the absence of electrical input, i.e., a binary logic level (0) input, to one input of a respectively connected AND-gate, comprising AND-gates (22c), (22f), (22g), and (22m), respectively;

2g) Subsequently, as master clock (16c) clocks timer (24c), timer (24c) applies a series of pulses to the clock input of counter (26), i.e., a serial-to-parallel straight ring counter which is preloaded with binary digits (10000), such that counter (26) then transitions to binary digits (01000), then to (00100), then to (00010), then to (00001), and then finally holding digits (10000) again (i.e., a modulo-5 counter). Wherein, counter (26) sequentially applies a pulse from respectively comprised flip flops to the other input of each of the respectively connected AND-gates (22c), (22f), (22g), and (22m). (Note that counter 26 can be divided into two counters, i.e., one counter for AND-gates (22c) and (22f), and one counter for AND-gates (22g) and (22m), such that the outputs of AND-gates (22c) and (22f), and the outputs of AND-gates (22g) and (22m), are digitally gates in parallel so that the process is faster, and the present invention is more applicable, in particular, for applications with a large number of memories which each store a large data patter.);

2h) Each of the AND-gates (22c) and (22f), and each of the AND-gates (22g) and (22m), which has two binary logic level (1) inputs then applies a pulse input, by way of a respective parallel connection, into the clock input of a respectively connected competitive shift register, i.e., a serial-to-parallel shift register initially holding binary digits (00) in measuring apparatus (8c). Wherein, for example, if memory unit (10c) matches two data inputs, i.e., matches one datum input at each of the exclusive-nor gates (4c) and (4f), then AND-gates (22c) and (22f) each temporarily have two logic level (1) inputs, and thus each apply a pulse input in a parallel connection into the clock input of the competitive shift register (28c); and if memory unit (10g) matches only one datum input at, for example, exclusive-nor gate (4g), then only AND-gate (22g) temporarily has two logic level (1) inputs, and thus only AND-gate (22g) applies a single pulse input in a parallel connection into the clock input of the competitive shift register (28g), and no pulse is input from AND-gate (22m) into the clock input of the competitive shift register (28g) in this example since AND-gate (22m) temporarily has only one logic level (1) input, i.e., temporarily has only one logic level (1) input (i.e., a pulse input) from counter (26), and has no input, i.e., has a binary logic level (0) input, from exclusive-nor gate (4m) which, in this example, did not match the datum input into latch (14m) (for comparison) with the datum stored in latch (14k);

2i) Shift registers (28c) and (28g), which each comprise a constant binary logic level (1) input applied to its respective data input, then each produce an output after each toggled flip flop at the node between a set flip flop and a following flip flop. Accordingly, in the same example as before, if shift registers (28c) and (28g) each produce an output after a first applied pulse from respectively connected AND-gates, then flip flops (30c) and (30g) each produce a binary logic level of (1) output at the first node, i.e., the node between flip flops (30c) and (30d) in shift register (28c), and the node between flip flops (30g) and (30h) in shift register (28g). Wherein, the binary logic level (1) outputs from flip flops (30c) and (30g) are applied as follows: a) are each applied in a parallel as data input to a following respectively connected flip flop comprising flip flops (30d) and (30h), respectively; b) are each applied in a parallel as input to a respectively connected AND-gate comprising AND-gates (32c) and (32g), respectively; and c) are each applied in a parallel to another respectively connected AND-gate comprising AND-gates (34c) and (34g), respectively.

Furthermore, in the same example, since shift register (28c) collectively receives two pulses from AND-gates (22c) and (22f) (since memory unit 10c matched two data inputs), then, in addition to flip flop (30c) producing binary logic level (1) output, flip flop (30d) (in shift register 28c) also produces binary logic level (1) output which is applied in parallel as input to AND-gate (32d); and is applied in parallel as input to AND-gate (34d). While, in the same example, only flip flop (30g) produces binary logic level (1) output (in shift register 28g), such that flip flop (30h) remains inactive (i.e., remains unset) since shift register (28g) collectively receives only one pulse from AND-gates (22g) and (22m) (because memory unit 10g only matched one datum input).

Then, in this example, as master clock (16c) clocks timer (36c), timer (36c) produces a pulse which is applied to AND-gates (32c), (32g), (32d), and (32h), such that AND-gates (32c) and (32g) each apply a pulse in a parallel connection to 2-bit counter (38c). Wherein, 2-bit counter (38c) thus receives two pulses and consequentially is set and applies binary logic level (1) input to NOT-gates (40c) and (40g) so that NOT-gates (40c) and (40g) each stop producing binary logic level (1) output, i.e., they each then produce a binary logic level (0) output; and the respectively connected AND-gates (34c) and (34g) then also each stop producing binary logic level (1) output, i.e., they also each then produce a binary logic level (0) output. However, since, according to this example, memory unit (10c) matches two data inputs, and memory unit (10g) only matches one datum input, then shift register (28c) exclusively produces a binary logic level (1) output from the next flip flop, i.e., flip flop (30d), such that only AND-gate (32d) produces a pulse which is applied to 2-bit counter (38d) which thus counts only one pulse, and therefore 2-bit counter (38d) is not set and does not produce a binary logic level (1) output to respectively connected NOT-gates (40d) and (40h), i.e., 2-bit counter (38d) applies binary logic level (0) input to NOT-gates (40d) and (40h). Wherein, NOT-gates (40d) and (40h) continue to apply binary logic level (1) input to AND-gates (34d) and (34h), respectively, such that one respectively connected AND-gate (i.e., AND-gate 34d) continues to produce binary logic level (1) output upon also receiving binary logic level (1) input from flip flop (30d) (which was toggled and set by the second pulse from memory unit 10c which exclusively matched two data inputs). In which case, the binary logic level (1) output of AND-gate (34d) is exclusively applied in a parallel connection as input to final AND-gate (42c). While, AND-gate (34c) does not produce output, i.e., does apply binary logic level (0) input, to respectively connected final AND-gate (42c), and AND-gates (34g) and (34h) do not produce output, i.e., they each apply binary logic level (0) input, to respectively connected final AND-gate (42g), since NOT-gate (40g) was deactivated by counter (38c), and flip flop (30h) did not toggle and was not set, and thus does not apply binary logic level (1) input to AND-gate (34h), i.e., does apply binary logic level (0) input to AND-gate (34h);

2j) Then, as master clock (16c) clocks timer (44c), timer (44c) applies one or more pulses in parallel to the other input of AND-gates (42c) and (42g);

2k) Then, in the same example, final AND-gate (42c), which receives binary logic level (1) input from AND-gate (34d) and one or more pulse inputs from timer (44c), consequentially applies one or more pulse inputs to, and activates, respectively connected target apparatus (46c). While, the other final AND-gate (42g) does not produce output, i.e., applies binary logic level (0) input, to respectively connected target apparatus (46g), so that target apparatus (46g) remains inactive; and finally 2l) Target apparatus (46c) utilizes the input to produce a respective result, e.g., target apparatus (46c) utilizes the input to actuate in order to produce a respective result. Note that the target input can be distributed to a multiple number of sub-targets in a target apparatus (46c) in order to produce the result such as, for example, the simultaneous actuation of a multiple number of sub-targets.

Note that comparison apparatus can be exclusively reset for a comparison of a new pattern of data input (reset apparatus not illustrated). While, alternatively, the apparatus can be reset for the comparison of a new pattern data with new stored patters of data (reset apparatus also not illustrated).

FIG. (2a') is another preferred embodiment of the present invention which is applied for pattern recognition. The preferred embodiment which is illustrated in FIG. (2a') is equivalent to the preferred embodiment of the present invention which pertains to FIG. (2a) except for the added application of apparatus (47) (outlined in dashed line format) in apparatus (12c'). In this case, the application of apparatus (47) can prevent an error from occurring when certain apparatus, e.g., a few exclusive-nor gates, are dysfunctional, and when the difference between matching data patterns is significantly small amongst memory units compared to the number of dysfunctional apparatus associated with the memory unit with the most matching data (wherein the connections of apparatus 47 with the remainder of apparatus 2a', which are not illustrated, are indicated by dashed lines).

In the case in which apparatus (47) is not applied, a memory unit with less matching data could win over, or tie with (and produce no targeted result), a memory unit with the most matching data, and create an error. Note that, while the preferred embodiment illustrated in FIG. (2a') is equivalent to the preferred embodiment which pertains to FIG. 2(a), the preferred embodiment illustrated in FIG. (2a'), nevertheless, applies memories which each store a significantly large data pattern.

In FIG. (2a'), as a master clock (16c') clocks timers (49b) and (49a), timers (49b) and (49a) each produce a pulse which is applied to 3-AND gates (34d') and (34h'), and 3-AND gates (34c') and (34g'), respectively. Wherein, contingent upon being made active by additional binary logic level (1) inputs from a respectively connected shift register flip flop and NOT-gate according to the conditions described in the preferred embodiment which pertains to FIG. (2a), any pulse produced by 3-AND gates (34d') and (34c') (and, equivalently, in FIG. 2a', any pulse produced by other active 3-AND gates in the same column which are connected to other equivalent timers, etc., all of which are not illustrated) are counted by counter (51a) in the respective column, and similarly, any pulse from 3-AND gates (34h') and (34g') (and, equivalently, in FIG. 2a', any pulse produced by other active 3-AND gates in the same column which are connected to other equivalent timers, etc., all of which are not illustrated are counted by counter (51b) in the respective column.

Accordingly, a significant number of threshold pulses from 3-AND gates in a column need to be counted by the respectively connected counter in the column before the counter in the column applies input to the respectively connected final AND-gate in the same column. In which case, in FIG. (2a'), as a master clock (16c') clocks timer (44c'), timer (44c') produces a pulse which is applied to final AND-gates (42c) and (42g), such that only the final AND-gate with additional input from a counter, which has counted a threshold number of pulses, produces a pulsed output to a respectively connected target apparatus (46c) or (46g) in order to produce a result. Note, however, while this sort of error preventive sub-process could prevent such error from occurring, the application of such a sub-process makes the pattern recognition process as a whole less sensitive to small differences in matched pattern data than if the pattern recognition process did not apply such an error preventive sub-process.

Another preferred embodiment of the present invention which is applied for pattern recognition applies a parallel-based method of pattern recognition. Wherein, such a parallel-based pattern recognition process applies a common input to a plurality of pattern recognition apparatus, which, for example, are each equivalent to the preferred embodiment of the present invention which pertains to FIG. (2a), for producing targeted results in parallel.

FIG. (2b) is a schematic view of another preferred embodiment of the present invention which is applied for pattern recognition. The preferred embodiment illustrated in FIG. (2b) applies a version of the digitally-based methods of patter recognition mentioned hereinbefore, but is different by requiring a certain threshold amount of pattern matching before producing a targeted result. Wherein, in FIG. (2b), the pulses from memory units (10c') and (10g') are first applied to threshold counters (48c) and (48g), respectively, i.e., here, 2-bit counters (48c) and (48g), respectively (in measuring apparatus 8n), such that a certain number of pulses are effectively eliminated before any remaining pulse can be input into competitive registers (i.e., flip flops) (28c') and/or (28g') in order to establish a minimum number of pulses needed to produce a targeted result, and to minimize the amount of apparatus needed in measuring apparatus (8n). In which case, when a certain number of pulses are counted by threshold counter (48c) and/or threshold counter (48g) (upon a significant amount of pattern matching), then threshold counter (48c) and/or threshold counter (48g) is set so as to produce output, i.e., so as to produce a binary logic level (1) output, which is then applied to one input of AND-gate (50c) and/or AND-gate (50g), respectively. Wherein, in the preferred embodiment illustrated in FIG. (2b), any remaining pulse which is subsequently applied in parallel to the other input of AND-gate (50c) and/or AND-gate (50g) then causes AND-gate (50c) and/or AND-gate (50g) to produce a pulse output which is applied to the clock input of register (28c') and/or register (28g'), respectively. In which case, the remainder of the pattern recognition process continues in a manner which is equivalent to the process described in the preferred embodiment which pertains to FIG. (2a).

FIG. (2c) is a schematic view of another simple example of the preferred embodiment which is illustrated in FIG. (1a). Wherein, the preferred embodiment in FIG. (2c), and especially illustrates measuring apparatus (8p) which is another version of apparatus (8a) illustrated in FIG. (1a).

In which case, in the method which pertains to FIG. (2c), the outputs of a one-dimensional array of exclusive-nor logic gates are input into apparatus (8p-A) which is, for example, a digital-to-analog converter, i.e., a voltage summer circuit, which produces an analog voltage output from the digital voltage inputs applied by the exclusive-nor gates; or the outputs of the array of exclusive-nor logic gates are input into apparatus (8p-A) which, as another example, comprises a current summer apparatus, e.g., a simple parallel circuit, which summates the current inputs from the exclusive-nor gates, and, then, converts the summated current output into an analog voltage using a current to voltage converter. Wherein, in either case, the analog voltage output is then measured with voltage measuring apparatus (8p-B) (e.g., a voltmeter) in apparatus (8p).

FIG. (2c') is a schematic view of a more specific version of the preferred embodiment which is applicable for pattern recognition illustrated in FIG. (2c). Wherein, in the preferred embodiment illustrated in FIG. (2c'), first, a pattern of data is input for comparison with a plurality of stored patterns of data which are respectively stored in a plurality of one-dimensional arrays of exclusive-nor gates comprised in memory units (10c) and (10g). Then, each of the exclusive-nor gate arrays comprised in memory units (10c) and (10g) produces a collection of voltage or current outputs which are input into apparatus (8p'-A) and (8p"-A), respectively. Then, in the case of voltage outputs, apparatus (8p'-A) and (8p"-A) each summate the digital voltage outputs from the exclusive-nor gates with a digital-to-analog converter, i.e., a voltage summer circuit, in order to produce an analog voltage output; or, in the case of current outputs, apparatus (8p'-A) and (8p"-A) each summate the current outputs from the exclusive-nor gates with a current summer apparatus, e.g., apparatus comprising a simple parallel circuit, and then convert the summated current output into an analog voltage using a current to voltage converter.

Wherein, then, in either case, the analog voltage outputs from apparatus (8p'-A) and (8p"-A) are applied to the quantizers of the flash analog-to-digital converter quantization apparatus (52r) and (52t), respectively, in voltage measuring apparatus (8p'-B) in measuring apparatus (8p'). Then, comparators comprising, for example, comparators (54r) and (54t) in quantization apparatus (52r) and (52t), respectively, each produce an output which is applied to a respectively connected AND-gate, i.e., a comparator produces the presence of electrical output, i.e., a binary logic level (1) output, when the analog voltage input applied to the comparator is greater than a comparator's reference voltage, or a comparator produces the absence of electrical output, i.e., a binary logic level (0) output, when the analog voltage input applied to the comparator is less than a comparator's reference voltage. Wherein the remainder of the method and apparatus applied from that point forward is equivalent to that which is applied in the method in the preferred embodiment which pertains to FIG. (2a) so as to produce a respective targeted result.

While still other preferred embodiments can apply a greater number of memory units along with other respective apparatus for comparing an input pattern with respect to a larger number of stored patterns in memory units. Note here with respect to the preferred embodiment which is applied for pattern recognition which pertains to FIG. (2a), or any equivalent preferred embodiment, that the two outputs from the two nodes in the same row which are each input into one of the two timed AND-gates which are then digitally gated and counted by a 2-bit counter can be, instead, input together into a single AND-gate, and the output of such a single AND-gate could then be connected directly into the NOT-gate, which the 2-bit counter would otherwise be connected to, in order to produce a similar gated effect (thus eliminating the portion of the method which applies the timed AND-gates and the 2-bit counters). However, the 2-bit counter method which applies the respectively connected timed AND-gates as, for example, described in the preferred embodiments which pertain to FIGS. (2a) and (2c'), allow for the comparison of a larger number of memory units in other embodiments.

Figure 2A:
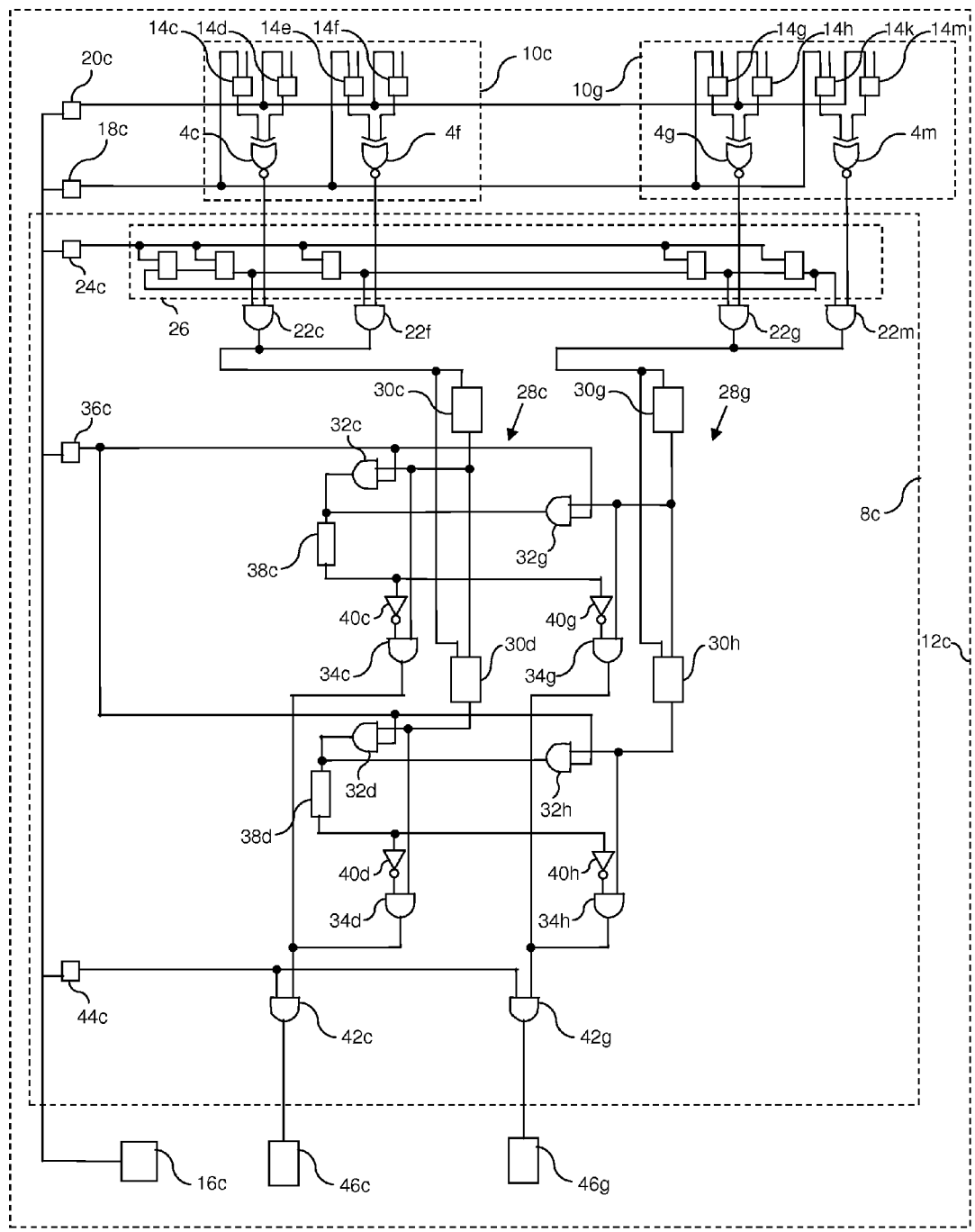
Figure 2A:
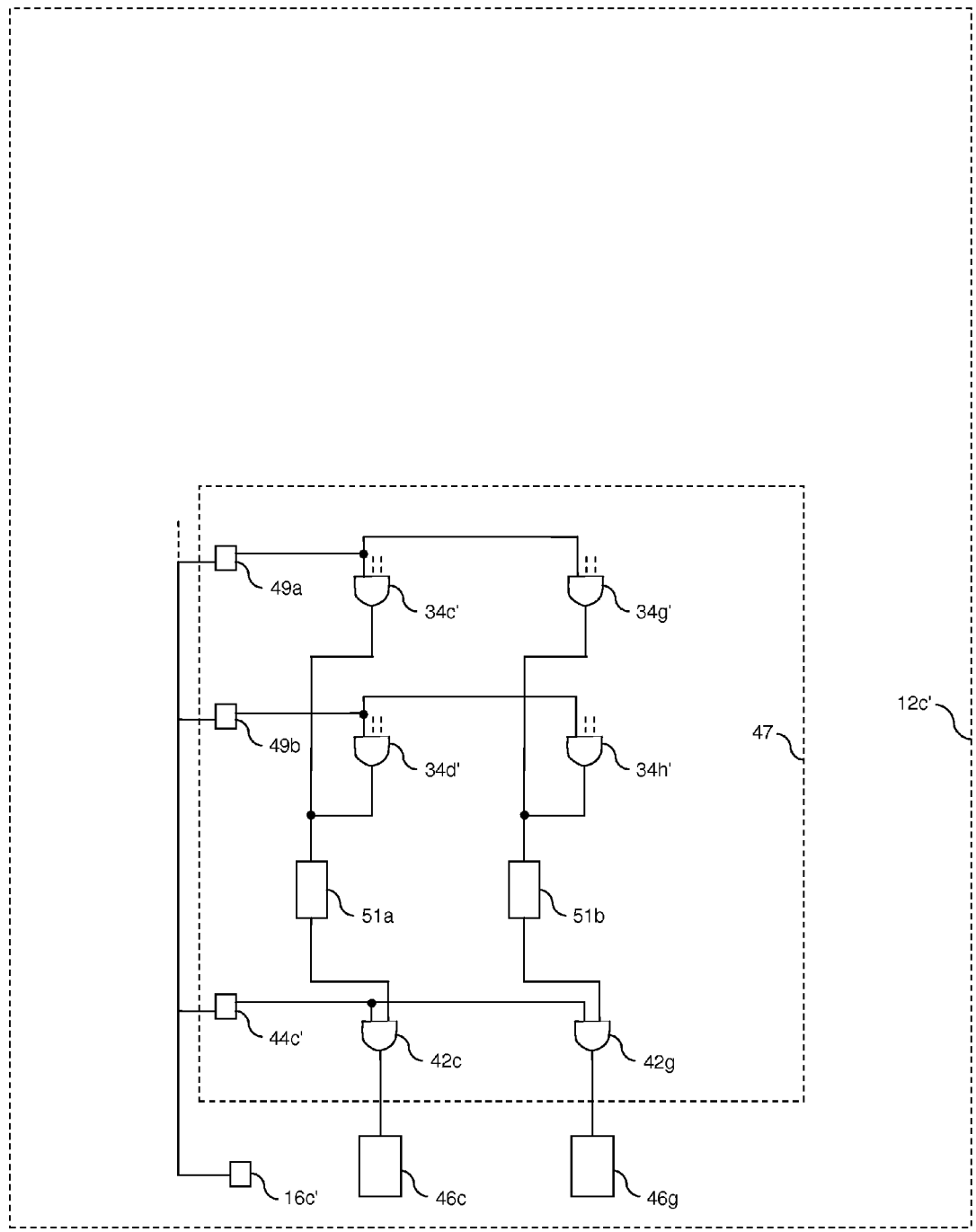
Figure 2B:
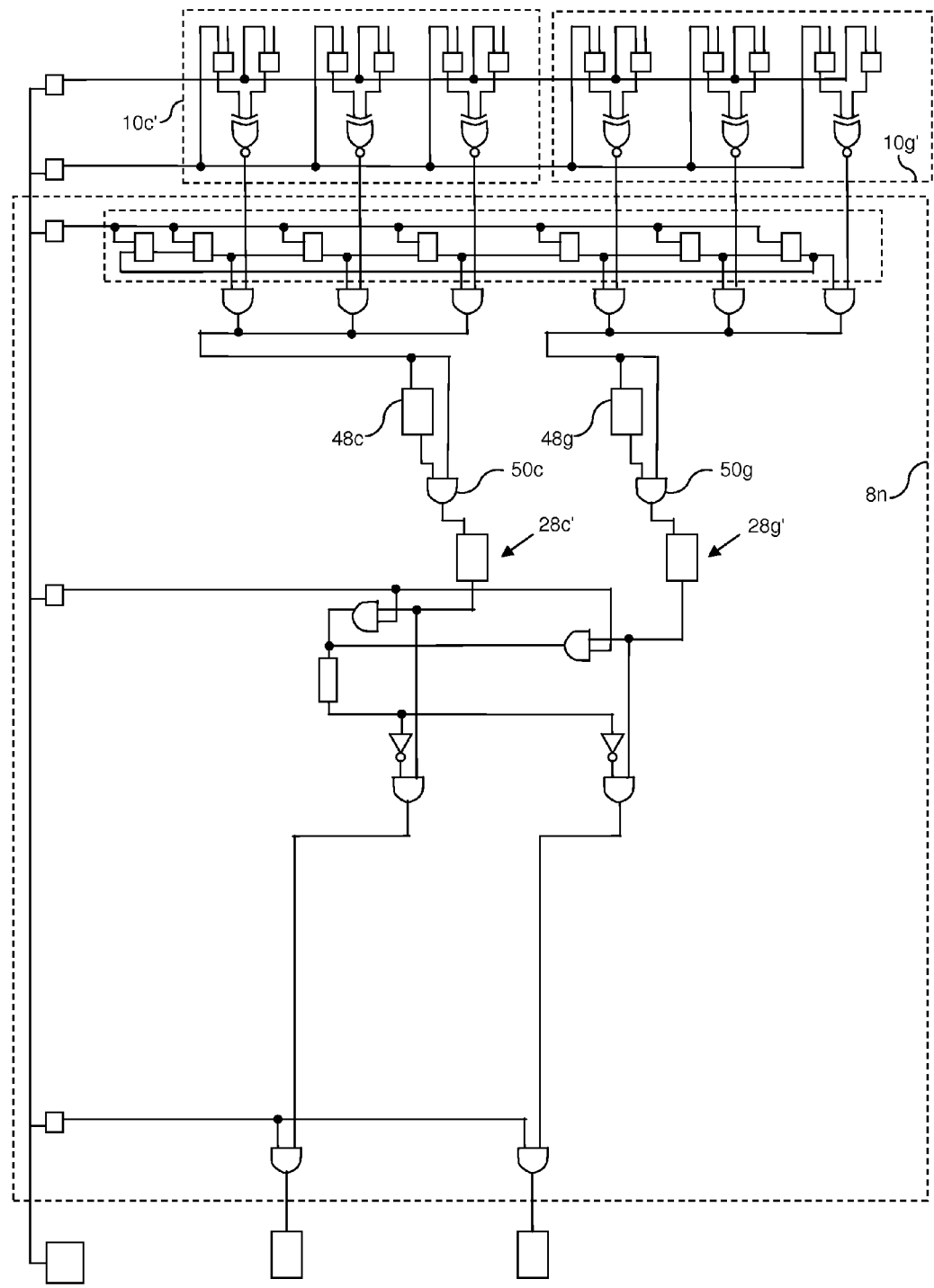
Figure 2C:
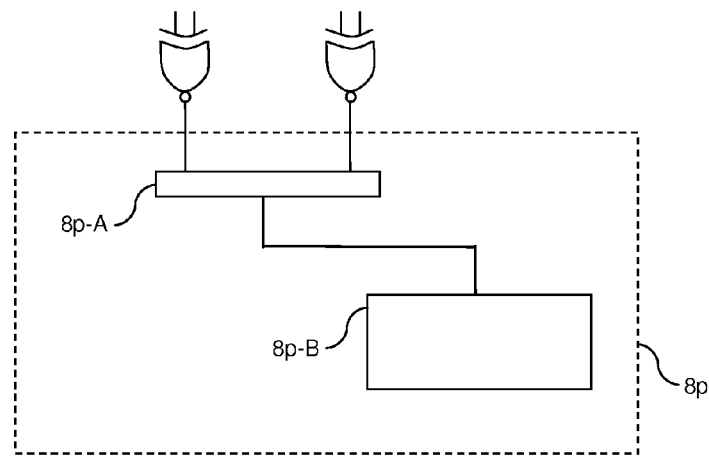
Figure 2C:
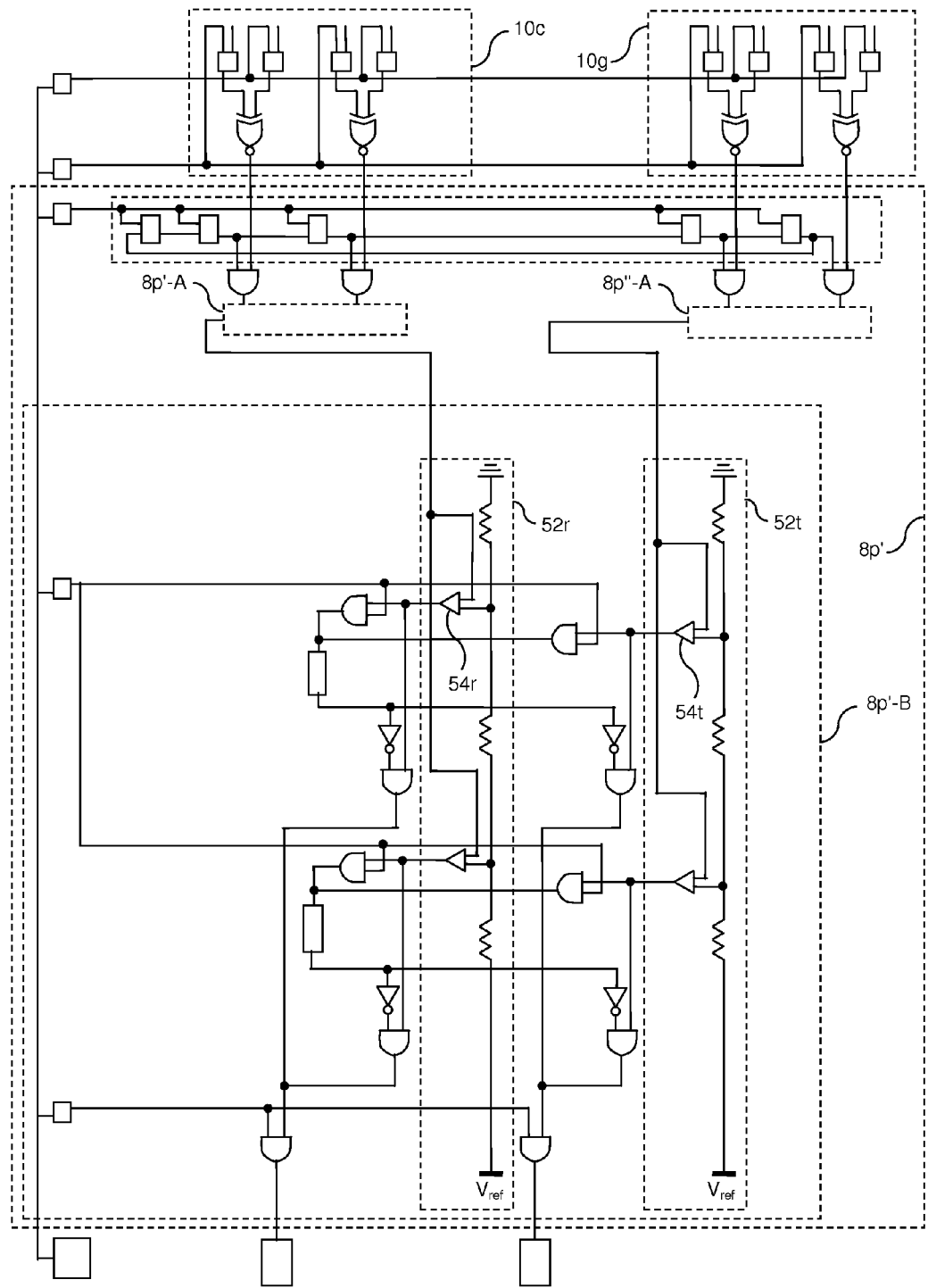

FIGS. (3A), (3B), and (3C) are schematic views which together represent a preferred embodiment of the present invention which is applied for a combination-based method of pattern recognition which is different by applying a process which combines a plurality (i.e., here, two) pattern recognition apparatus which each apply a process which is equivalent to the pattern recognition process which is described in the preferred embodiment which pertains to FIG. 2a except for some respective modifications which are made in conjunction with the addition of a third apparatus which applies a combination-based pattern recognition process for storing and comparing combinations of patterns of data. Wherein, FIG. (3A) especially illustrates some detail of pattern recognition apparatus (12u). While, FIG. (3B) illustrates only limited detail of pattern recognition apparatus (12u), along with limited detail of pattern recognition apparatus (12w) (which is equivalent to pattern recognition apparatus 12u), and limited detail of combination-based pattern recognition apparatus (12x). While furthermore, FIG. (3C) especially illustrates combination-based pattern recognition apparatus (12x) in more detail, along with pattern recognition apparatus (12u) and (12w) which are only illustrated in limited detail.

Figure 3A:
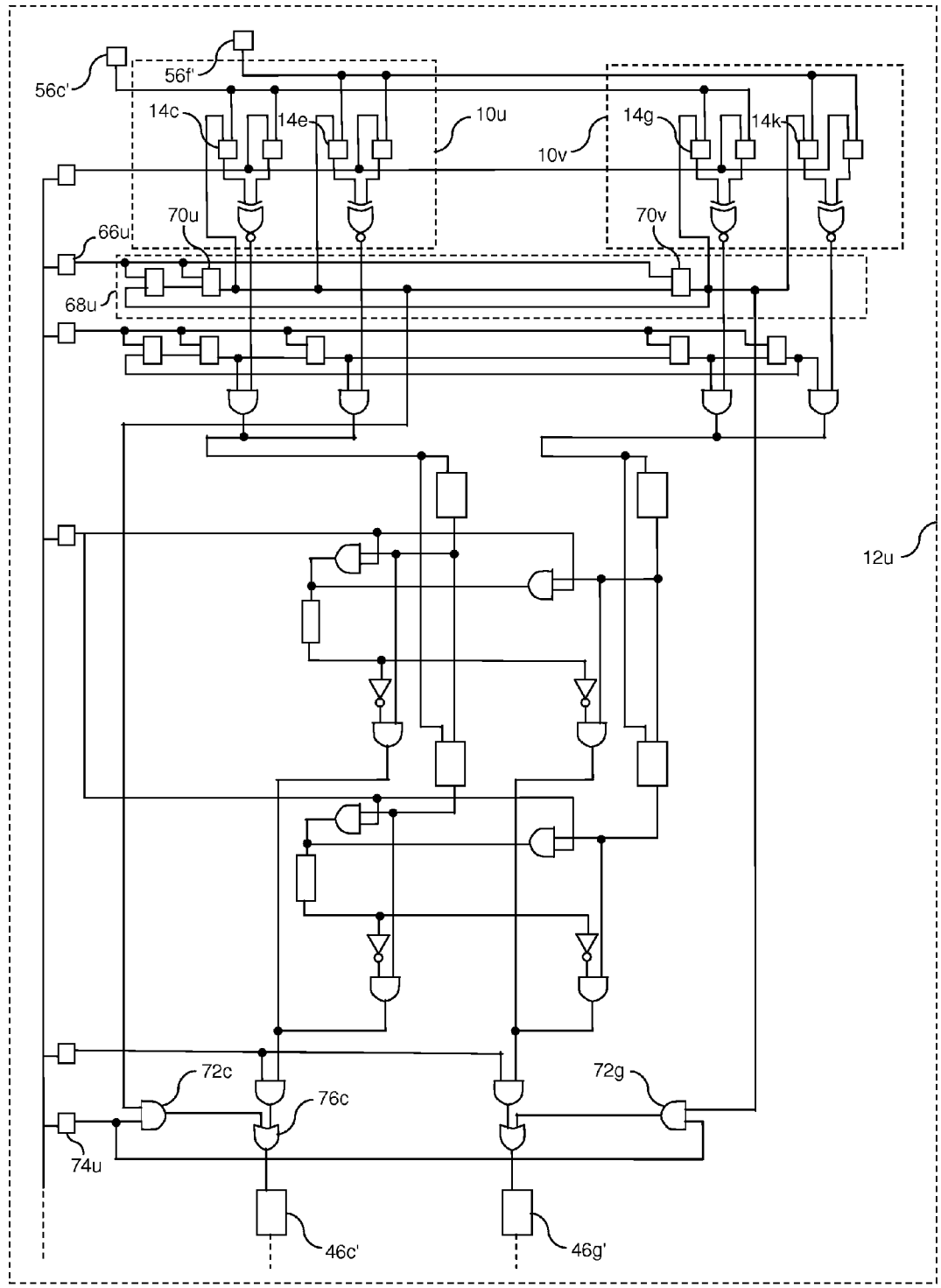
Figure 3B:
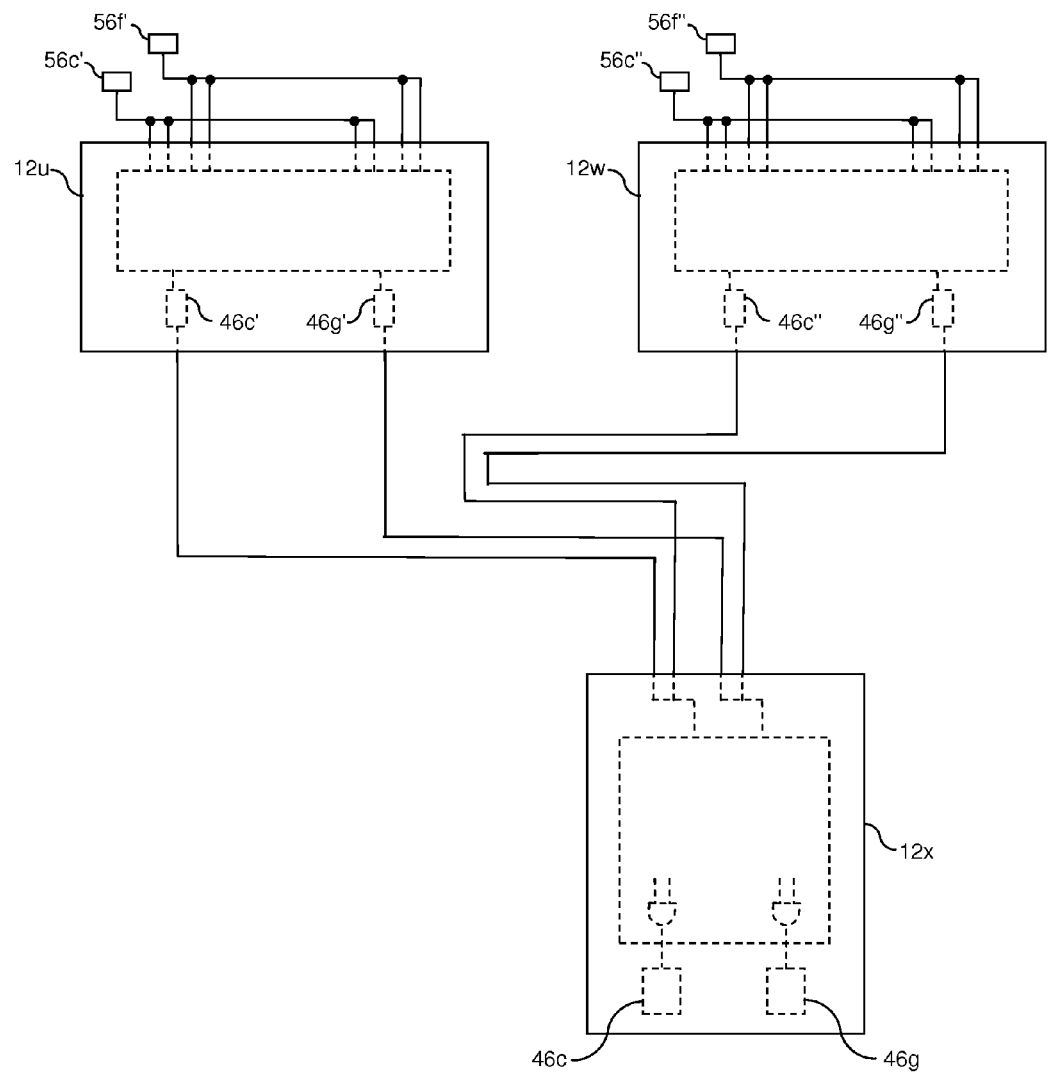
Figure 3C:
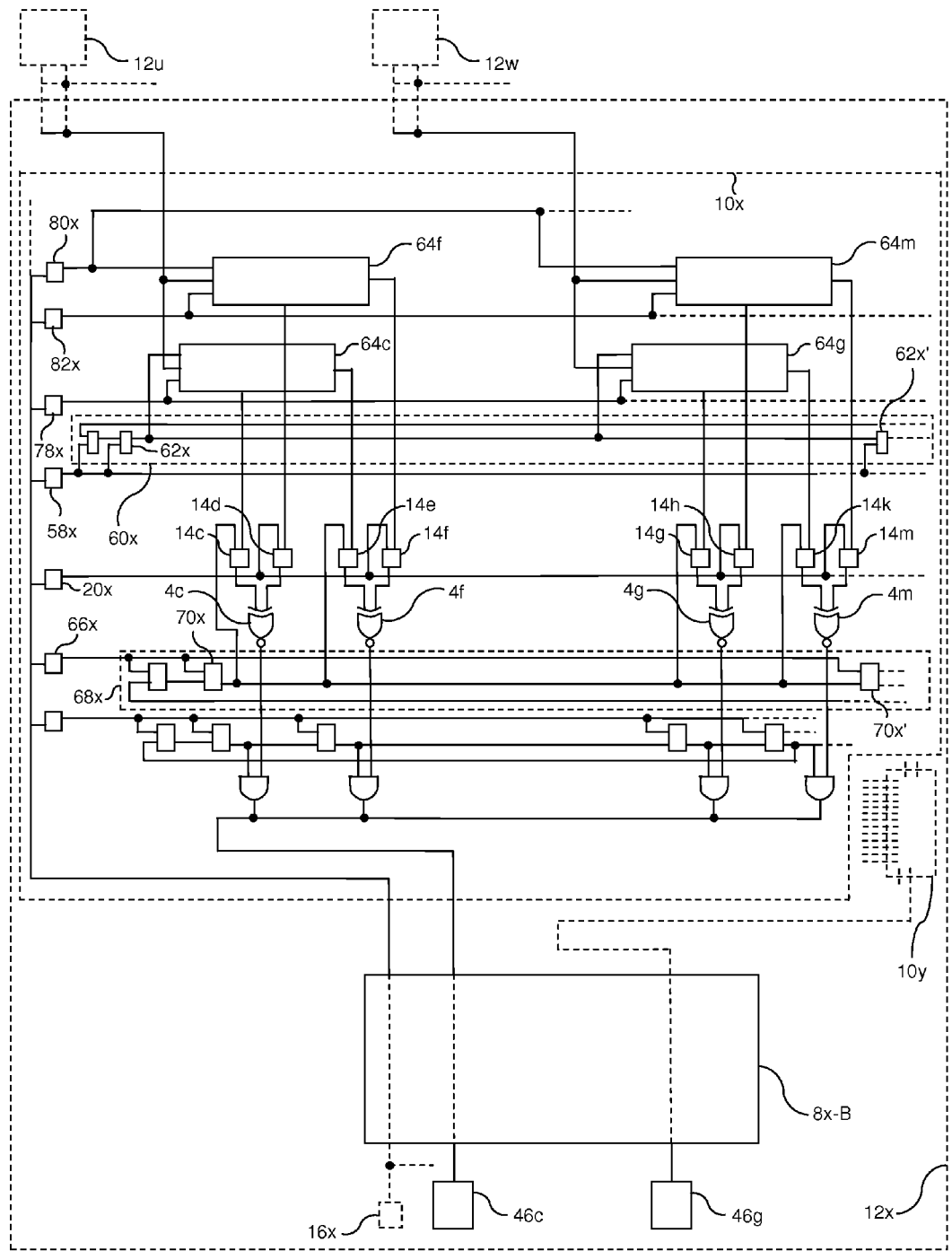

The storage stage of the combination-based pattern recognition process occurs as follows:

1) In FIGS. (3A) and (3B), sensory apparatus (56c') and (56f'), e.g., optical sensory apparatus, each apply electrical input, i.e., binary logic level (1) input, or the absence of electrical input, i.e., binary logic level (0) input, to the data input of respectively connected storage and comparison latches. Wherein, illustrated in more detail in FIG. (3A), sensory apparatus (56c') applies input to storage latches (14c) and (14g), and sensory apparatus (56f') applies input to storage latches (14e) and (14k); and in FIG. (3B), sensory apparatus (56c") and (56f") comprising a different sort of sensory apparatus, e.g., acoustic sensory apparatus, each apply electrical input, i.e., binary logic level (1) input, or the absence of electrical input, e.g., binary logic level (0) input, to the data input of each of the respectively connected storage and comparison latches in an equivalent manner;

2) Then, in FIG. (3C), as master clock (16x) clocks timer (58x), timer (58x) applies a pulse to counter (60x), i.e., a serial-to-parallel straight ring counter which is preloaded with binary digits (100...), such that counter (60x) transitions to binary digits (010...), and such that second stage flip flop (62x) is set;

3) Then, flip flop (62x) applies binary logic level (1) input to the write enable input of each of the 2-bit storage shift registers (64c) and (64g), i.e., serial-in to parallel-out storage shift registers, and also applies a binary logic level (1) input to the data input of the flip flop (62x');

4) Then, equivalent processes occur in pattern recognition apparatus (12u) and (12w) in a parallel manner as described as follows, for example, for pattern recognition apparatus (12u). In which case, in the example of the process for pattern recognition apparatus (12u), as master clock (16x) in FIG. (3C) clocks timer (66u) illustrated in FIG. (3A), timer (66u) applies a pulse to counter (68u), i.e., a modulo-3 serial-to-parallel straight ring counter, which is preloaded with digits (100), such that counter (68u) transitions to digits (010), and such that second stage flip flop (70u) is set (wherein master clock 16x is connected to timers illustrated in FIG. 3C, and connected to timers illustrated in FIG. 3A as indicated by the dashed line at the upper left corner area of FIG. 3C and the dashed line at the lower left corner area of FIG. 3A);

5) Then, counter (68u) applies binary logic level (1) input from flip flop (70u) to the clock inputs of latches (14c) and (14e), and applies a binary logic level (1) input to AND-gate (72c), and furthermore applies a binary logic level (1) input to the data input of flip flop (70v);

6) Then, in FIG. (3A), storage latches (14c) and (14e) in memory unit (10u), and storage latches in the first memory unit in apparatus (12w), which is illustrated in FIGS. (3B) and (3C), each input the respective datum by applying an electrical input, i.e., a binary logic level (1) input, or the absence of electrical input, i.e., a binary logic level (0) input, to one input of a respectively connected exclusive-nor gate in a manner which is equivalent to the manner of data input which is described in the pattern recognition process in the preferred embodiment which pertains to FIG. 2a), such that a pattern of data is stored in the first memory units in apparatus (12u) and (12w) (wherein memory unit 10u is the first memory unit in apparatus 12u);

7) Then, from FIG. (3C), as master clock (16x) clocks timer (74u), which is illustrated in FIG. 3A), timer (74u) applies a series of pulses to the other input of AND-gate (72c) which is illustrated in FIG. (3A), and also applies a series of pulses to one input of AND-gate (72g) which is also illustrated in FIG. (3A);

8) Then, in FIG. (3A), AND-gate (72c) applies a series of pulse inputs to OR-gate (76c);

9) Consequentially, OR-gate (76c) applies a series of pulse inputs to the clock input of 2-bit address shift register (46c'), i.e., a serial-in to serial-out non-destructive 2-bit address shift register preloaded, for example, with binary bit address (00), and comprising a permanent low level, i.e., binary logic level (0), applied to its read/write enable input (wherein data and read/write input terminals are not illustrated);

10) Then, in FIG. (3A), address shift register (46c') reads binary address (00) by way of a parallel into the data input of each of the shift registers (64f) and (64c) which are illustrated in FIG. (3C), (and reads binary address 00 by way of the same parallel into the data input of each of the equivalent shift registers in memory unit 10y in apparatus 12x as indicated by a dashed line from the parallel connection from apparatus 12u); and, in FIG. (3C), as master clock (16x) clocks timer (78x), timer (78x) applies a series of pulses to the clock input of each of the storage shift registers (64c) and (64g) (as well as applies a series of pulses to the clock input of each of the equivalent storage shift registers in memory unit 10y in apparatus 12x by way of the same parallel as indicated by a dashed line). Note that the dashed lines at the bottom of FIG. (3A) from targets (46c') and (46g') in apparatus (12u) (and from the same targets 46c' and 46g'in apparatus 12u illustrated in FIG. 3B) are considered to correspond with the dashed lines illustrated at the top of FIG. (3C) which are coming from apparatus (12u), and, equivalently, the dashed lines which are coming from address shift registers (46c") and (46g"), which are illustrated in apparatus (12w) in FIG. (3B), are considered to correspond with the dashed lines which are illustrated at the top of FIG. (3C) which are coming from apparatus (12w). Also, in FIG. (3C), note that the relatively small size and dashed line format of apparatus (10y), and the dashed line format of its respective connection to apparatus (8x-B), indicate the greater amount of mock representation of the respective apparatus.

Wherein, nevertheless, binary address (00) is consequentially only written into storage shift register (64c) because of its write enabling input from flip flop (62x). While, an equivalent process occurs in parallel for pattern recognition apparatus (12w), such that targeted serial-in to serial-out non-destructive 2-bit address shift register (46c") illustrated in FIG. (3B), which is preloaded with, for example, binary bit address (10), and is associated with the first memory unit in pattern recognition apparatus (12w), writes binary address (10) into storage shift register (64g);

11) Consequentially, in FIG. (3C), parallel outputs from flip flops from storage shift register (64c) apply inputs (00), i.e., inputs (0) and (0), to storage latches (14c) and (14e), respectively, and parallel outputs from flip flops from storage shift register (64g) apply inputs (10), i.e., inputs (1) and (0), to storage latches (14g) and (14k), respectively;

12) Then, in FIG. (3C), as master clock (16x) clocks timer (66x), timer (66x) consequentially applies a pulse to counter (68x), i.e., a serial-to-parallel straight ring counter which is preloaded with digits (100. . . ), such that counter (68x) transitions to digits (010. . . ), and such that second stage flip flop (70x) is set;

13) Then, counter (68x) applies binary logic level (1) input from flip flop (70x) to the clock input of each of the storage latches (14c), (14e), (14g), and (14k), and also applies a binary logic level (1) input to the data input of flip flop (70x');

14) Then, in FIG. (3C), storage latches (14c) and (14e) apply inputs (0) and (0), respectively, to exclusive-nor gates (4c) and (4f), respectively; and storage latches (14g) and (14k) apply inputs (1) and (0), respectively, to exclusive-nor gates (4g) and (4m), respectively, such that a combination of pattern data is stored in memory unit (10x) in apparatus (12x) illustrated in FIG. (3C);

15) Then, an equivalent process is repeated for storing the next combination of patterns in the next memory units in apparatus (12u), (12w), and (12x) (as indicated by certain respectively dashed lines). Wherein, some of the steps which prepare the process for the remaining equivalent steps (as described hereinbefore) for the next storage of patterns data in memory units in apparatus (12u), (12w), and (12x) include the step in which master clock (16x) clocks timers (58x) and (66u) such that they apply another pulse to the clock input of each of the counters (60x) and (68u), respectively, so that flip flops (62x) and (70u) are reset and stop producing output, i.e., such that flip flop (62x) applies binary logic level (0) input to the write enable input of each of the respectfully connected storage shift registers (64c) and (64g) in FIG. (3C), and such that flip flop (70u) applies binary logic level (0) input to the clock input of each of the respectfully connected storage latches (14c) and (14e) in FIG. (3A); and such that flip flop (62x') is set and applies binary logic level (1) input to the write enable input of each of the respectfully connected storage shift registers in the next memory unit (10y) in combination-based pattern recognition apparatus (12x) as indicated by the respectively dashed lines in FIG. (3C), and such that flip flop (70v) is set and applies binary logic level (1) input to the clock input of each of the respectfully connected storage latches (14g) and (14k) in memory unit (10v), and applies binary logic level (1) input to AND-gate (72g) in FIG. (3A).

Furthermore, the storage of the next combination of patterns includes the steps in which master clock (16x) clocks, and again sets, timer (66x) so that timer (66x) applies another pulse to counter (68x), such that flip flop (70x) is reset and stops producing output, i.e., such that flip flop (70x) applies binary logic level (0) input to storage latches (14c), (14e), (14g), and (14k), and such that flip flop (70x') is set and applies binary logic level (1) input to the clock input of each of the storage latches in the next memory unit (10y) in combination-based pattern recognition apparatus (12x). Wherein, as the equivalent process is repeated for storing the next combination of patterns for the next memory unit including the application of different patterns of sensory input, the storage latches in the next memory unit (10y) then apply inputs comprising the digits of the next respective pattern of addresses to exclusive-nor gates in the next memory unit (10y) in combination-based pattern recognition apparatus (12x). In which case, in effect, after the equivalent process is repeated in its entirety, a combination pattern of addresses, for example, (01) and (11), from address shift registers (46g') and (46g"), respectively, is stored in the next memory unit (10y) in combination-based pattern recognition apparatus (12x); and 16) Finally, upon completion of the equivalent storage process, as master clock (16x) clocks timers (58x), (66u), and (66x), then timers (58x), (66u), and (66x) consequentially clock counters (60x), (68u), and (68x), respectively, which, then, fully cycle and return to their initial conditions.

Next, the comparison stage of the combination-based pattern recognition process occurs as follows:

1) In FIG. (3C), as master clock (16x) clocks timer (80x), timer (80x) is set, and consequentially applies binary logic level (1) input to the write enable input of each of the 2-bit comparison shift registers (64f) and (64m), i.e., serial-in to parallel-out comparison shift registers, and applies binary logic level (1) input to the write enable input of each of the equivalent comparison shift registers in memory unit (10y) in apparatus (12x) as indicated by the respectively dashed line;

2) Then, with the application of sensory apparatus (56c') and (56f') and sensory apparatus (56c") and (56f"), data patterns are input into, and compared with data patterns stored in memory in apparatus (12u) and (12w), respectively. In which case, patterns are then compared in a pattern recognition process in apparatus (12u) and (12w) (in a parallel manner) by processes which are each equivalent to the comparison stage of the pattern recognition process described in the preferred embodiment which pertains to FIG. (2a)(with the respective application of the OR-gates). Also, in FIG. (3C), as master clock (16x) clocks timer (82x), timer (82x) applies a series of pulses to the clock input of each of the comparison shift registers (64f) and (64m); and applies a series of pulses to the clock input of each of the comparison shift registers in memory unit (10y) in apparatus (12x) as indicated by a respectively dashed line.

Wherein, more specifically, for example, address shift register (46c') in apparatus (12u) reads binary address (00) by way of a parallel into the data input of each of the shift registers (64f) and (64c) illustrated in FIG. (3C) after retrieving the respectfully associated memory (10u) (and reads a binary address by way of the same parallel into the data input of each of the equivalent shift registers in memory unit 10y in apparatus 12x as indicated by a respectively dashed line). In which case, nevertheless, a binary address is consequentially written into write enabled comparison shift register (64f). Meanwhile, similarly, one of the two address shift registers comprising, for example, address shift register (46c") in apparatus (12w) effectively writes a binary address comprising, for example, address (10) (after retrieving the memory associated with address shift register (46c") into write enabled comparison shift register (64m) in combination apparatus (12x) illustrated in FIG. (3C) by an equivalent process, such that, for example, retrieved binary addresses (00) and (10) are effectively written into comparison shift registers (64f) and (64m), respectively, in memory unit (10x); and also written into equivalent comparison shift registers in memory unit (10y) in apparatus (12x) (Wherein, connections to memory unit 10y by a certain apparatus are indicated by the sixteen respectively dashed lines into memory unit 10y.) Note that in the example herein, timers, or also respective counters, are shared between memories (10x) and (10y), in which case counters in memory unit (10x) each initialize a corresponding counter in memory unit (10y) with a respective data input.

3) Consequentially, in FIG. (3C), parallel outputs from flip flops from comparison shift register (64f) apply inputs (00), i.e., (0) and (0), to comparison latches (14d) and (14f), respectively, and parallel outputs from flip flops from comparison shift register (64m) apply inputs (10), i.e., (1) and (0), to comparison latches (14h) and (14m), respectively; and, equivalently, flip flops in comparison shift registers apply inputs to comparison latches in memory unit (10y) in apparatus (12x);

4) Then, in FIG. (3C), as master clock (16x) clocks timer (20x), timer (20x) is set, and consequentially applies a binary logic level (1) input to the clock input of each of the comparison latches (14d), (14f), (14h), and (14m); and equivalently applies a binary logic level (1) input to the clock input of each of the comparison latches in memory unit (10y) in apparatus (12x) (as indicated by the respectively dashed line);

5) Consequentially, in FIG. (3C), comparison latches (14d) and (14f) apply inputs (0) and (0), respectively, to exclusive-nor gates (4c) and (4f), respectively and comparison latches (14h) and (14m) apply inputs (1) and (0), respectively, to exclusive-nor gates (4g) and (4m), respectively; and, equivalently, comparison latches apply inputs to exclusive-nor gates in memory unit (10y) in apparatus (12x); and 6) Finally, then, the particular combination of patterns of binary addresses (00) and (10) which are written into the comparison shift registers in pattern recognition apparatus (12x) for comparison are measured by digital pulse measuring apparatus (8x-B) in order to determine which stored combination in memory is the best match (by a process which is equivalent to the measuring process which is described in the pattern recognition process in the preferred embodiment which pertains to FIG. 2a). Wherein, the memory unit which is retrieved then produces an output to a respective target, i.e., target (46c) or (46g) in FIG. (3C), in order to produce a respective result, i.e., in this example, memory unit (10x) produces an output to target (46c) to produce a result since address (00) and (10) were matched by a memory unit (10x). Note that sensory apparatus comprising, for example, optical sensory and/or other sensory apparatus positioned at a target, can be input as feedback into a pattern recognition process and provide additional patter data for producing the next result in a pattern recognition process after the pattern recognition process produced an initial acuation, for example, of target apparatus.

FIGS. (4A) and (4B) are schematic views which together illustrate a preferred embodiment of the present invention which is applied for a sequence-based method of pattern recognition which is different in that it is applied for storing and comparing sequences of data patterns. Wherein, FIG. (4A) especially illustrates some detail of pattern recognition apparatus (12c") which is substantially equivalent to pattern recognition apparatus (12c), which is illustrated in FIG. (2a), except for some respective modifications for the application herein. While, FIG. (4B) illustrates sequence-based pattern recognition apparatus (12aa) in some detail, and also illustrates apparatus (12c") in dashed line format in order to represent its continuation from FIG. (4A).

The storage stage for the sequence-based pattern recognition process occurs as follows:

1) In FIG. (4B), as master clock (16aa) clocks timer (58aa), timer (58aa) applies a pulse to the clock input of counter (60aa), i.e., a modulo-3 straight ring counter which is preloaded with binary bits (100), such that counter (60aa) transitions to bits (010);

2) Second stage flip flop (62aa) is thus set, and consequentially applies logic level (1) input to the write enable input of 2-bit storage shift register (64c), i.e., a serial-in to parallel-out shift register, and also applies a binary logic level (1) input to the data input of flip flop (62aa');

3) Then, with respect to FIG. (4A), with the precondition that patterns are already stored in memory as described for the storage stage in the preferred embodiment which pertains to FIG. (2a), a pattern of data is retrieved from pattern recognition apparatus (12c") from, for example, memory unit (10c) (as described for the retrieval of memory unit 10c in the comparison stage in the preferred embodiment which pertains to FIG. 2a). Wherein, output from memory unit (10c) (and certain respectively following apparatus) along with a pulse from (44c) (as timer 44c is clocked by master clock 16aa which is illustrated in FIG. 4B) causes final AND-gate (42c) to apply a pulse to the clock input of 1-bit address register (46c''').

Figure 4A:
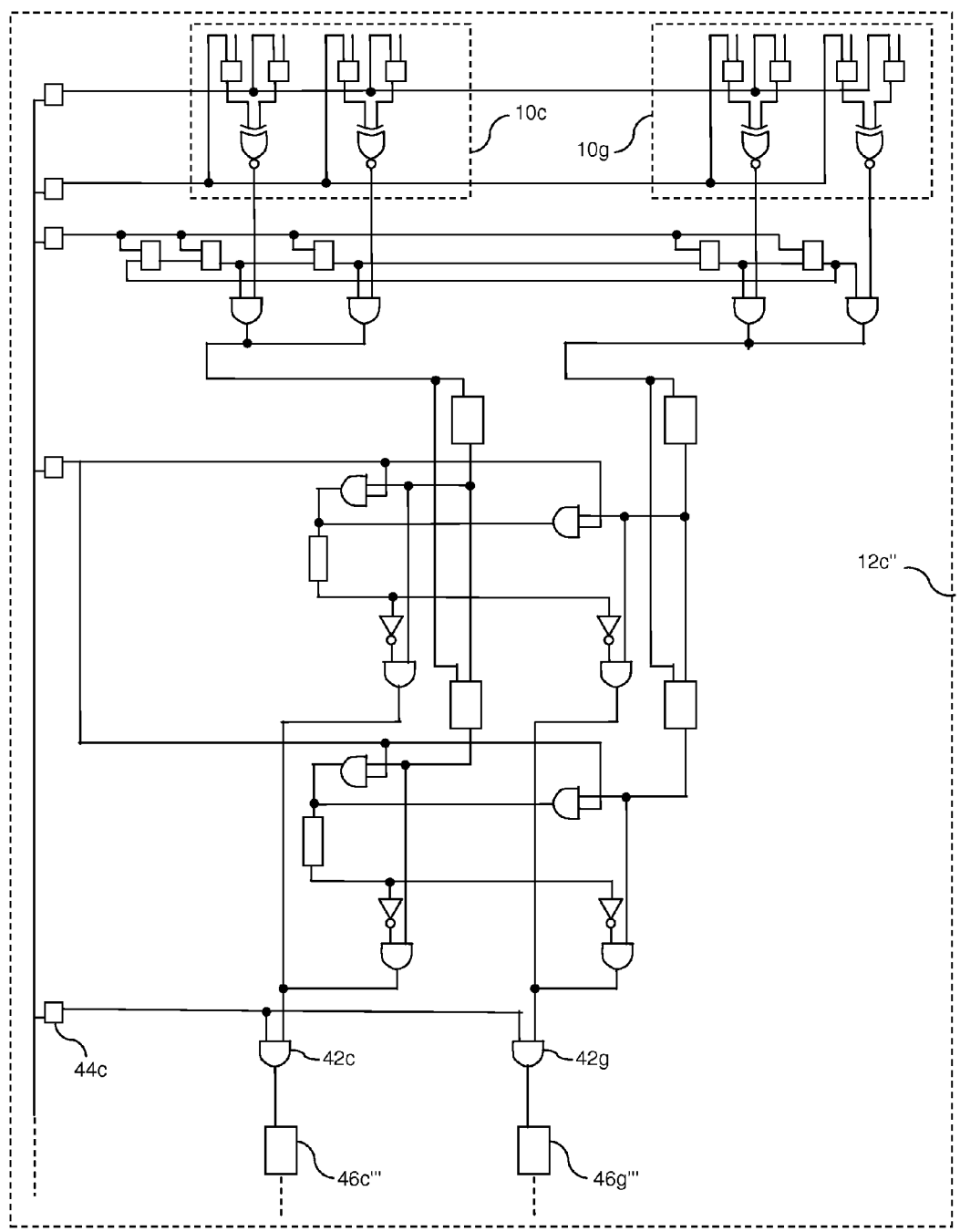
Figure 4B:
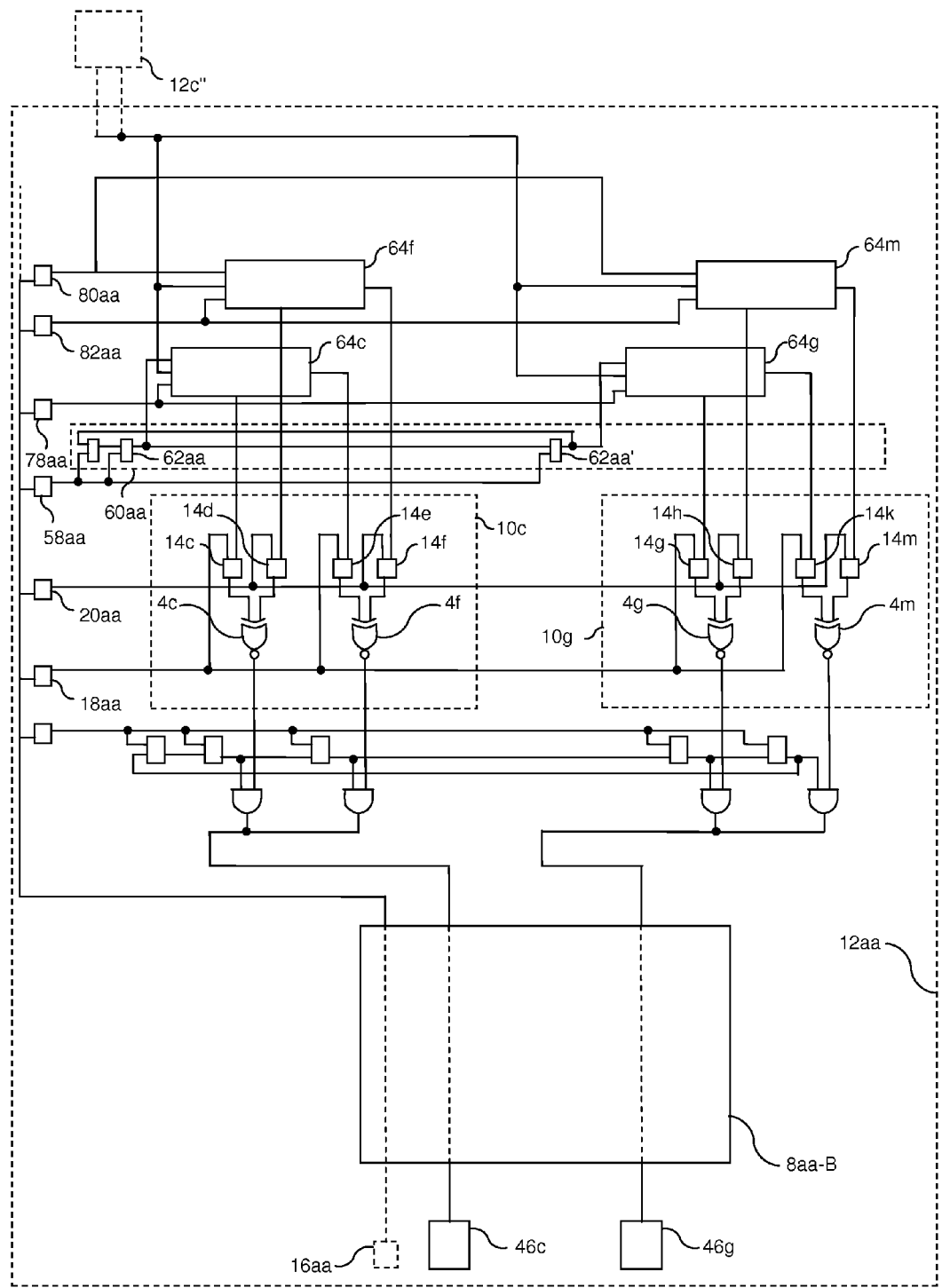

4) Consequentially, in FIG. (4A), target (46c''') comprising a non-destructive serial-in to serial-out 1-bit address register preloaded, for example, with binary logic level (0), and comprising a permanent low level, i.e., binary logic level (0), applied to its read/write enable input (data and read/write input terminals not illustrated), then reads binary address (0), i.e., applies a binary logic level (0) input, in a parallel connection into the data input of 2-bit shift registers (64f), (64c), (64m), and (64g), i.e., serial-in to parallel-out shift registers illustrated in FIG. (4B); and also in FIG. (4B), as master clock (16aa) clocks timer (78aa), timer (78aa) applies a pulse to the clock input comprised by 2-bit shift registers (64c) and (64g) (Here, the dashed lines at the bottom of FIG. 4A from address registers (46c''') and (46g''') are considered to correspond with the dashed lines illustrated at the top of FIG. 4B which are coming from apparatus 12c'');

5) Consequentially, binary address (0) is written into storage shift register (64c) illustrated in FIG. (4B) because of its write enabling input from flip flop (62aa);

6) Then, in FIG. (4B), storage shift register (64c) applies a binary logic level (0) input to the data input of storage latch (14c), i.e., binary address bit (0) is input to storage latch (14c);

7) Then, with respect to FIG. (4A), another pattern of data is input into, and compared with, patterns stored in pattern recognition apparatus (12c'') (as described for the comparison stage in the pattern recognition process in the preferred embodiment which pertains to FIG. 2a). Wherein, for example, if memory unit (10g) is retrieved, then memory unit (10g) (and certain respectively following apparatus) along with a pulse from (44c) cause AND-gate (42g) to apply a pulse to target (46g'''), i.e., apply a pulse to the clock input of a non-destructive serial-in to serial-out 1-bit address register 46g''' which is preloaded, for example, with binary logic level (1), and comprises a permanent low level, i.e., binary logic level (0), applied to its read/write enable input (data and read/write input terminals not illustrated);

8) Address register (46g''') then reads binary address (1), i.e., applies a binary logic level (1) input, by way of a parallel connection into the data input of shift registers (64f), (64c), (64m), and (64g); and as master clock (16aa) clocks timer (78aa) in FIG. 4B), timer (78aa) again applies a pulse to the clock input comprised by storage shift registers (64c) and (64g);

9) Consequentially, binary address bit (1) is also written into storage shift register (64c) illustrated in FIG. (4B) because of its write enabling input from flip flop (62aa), such that storage shift register (64c) now holds the sequence of binary addresses (10);

10) Then, in FIG. (4B), storage shift register (64c) now applies address bit (1) to the data input of storage latch (14c) and also, now, applies address bit (0) to the data input of storage latch (14e), i.e., storage shift register (64c) applies binary logic levels (1) and (0) to the data inputs of storage latches (14c) and (14e), respectively, such that the sequence of address bits (11) are accordingly input into storage latches (14c) and (14e);

11) Then, in FIG. (4B), as master clock (16aa) clocks timer (58aa), timer (58aa) again applies another pulse to the clock input of counter (60aa), wherein flip flop (62aa) is reset and flip flop (62aa') is set in counter (60aa), such that flip flop (62aa) stops applying input to the write enable input comprised by shift register (64c), i.e., now applies a binary logic level (0) input to the write enable input comprised by shift register (64c); and such that flip flop (62aa') applies binary logic level (1) input to the write enable input comprised by storage shift register (64g);

12) Then, a different sequence of the same patterns is retrieved from apparatus (12c''), such as, for example, a reverse sequence, such that the storage of a different pattern sequence of binary address bits, i.e., binary address sequence (01), is stored in storage shift register (64g) in a process which is equivalent to the process described hereinbefore for storing the sequence of addresses (10) in shift register (64c);

13) Consequentially, in FIG. (4B), address bit (0) is input into storage latch (14g) and address bit (1) is input into storage latch (14k) by storage shift register (64g), i.e., storage shift register (64g) applies binary logic levels (0) and (1) to the data inputs of storage latches (14g) and (14k), respectively;

14) Then, in FIG. (4B), as master clock (16aa) clocks timer (18aa), timer (18aa) is set, and consequentially applies a binary logic level (1) input to the clock input of each of the storage latches (14c), (14e), (14g), and (14k);

15) Then, in FIG. (4B), in the same example, storage latches (14c) and (14e) apply binary logic levels (1) and (0), respectively, to exclusive-nor gates (4c) and (4f), respectively; and storage latches (14g) and (14k) apply binary logic levels (0) and (1), respectively, to exclusive-nor gates (4g) and (4m), respectively, wherein sequences of pattern addresses (i.e., sequences of patterns) are stored in memory units (10c) and (10g) in FIG. (4B); and 16) Finally, as master clock (16aa) clocks respectfully connected timers including timer (58aa), timer (58aa) clocks counter (60aa,) which then fully cycles and returns to its initial condition.

Next, the comparison stage of the sequence-based pattern recognition process occurs as follows:

1) In FIG. 4B), as master clock (16aa) clocks timer (80aa), timer (80aa) is set, and consequentially applies a binary logic level (1) input to the write enable input of each of the comparison shift registers (64f) and (64m);

2) Then, a comparison of two patterns is produced in the apparatus illustrated in FIG. (4A) by processes which are each equivalent to the comparison stage of the pattern recognition process which is applied in the preferred embodiment which pertains to FIG. (2a). Wherein, upon the retrieval of each winning pattern, the winning memory applies binary logic level (1) input to final AND-gate (42c) or (42g), such that, along with a pulse from timer (44c), final AND-gate (42c) or (42g) then applies a pulse input to target apparatus (46c''') or (46g'''), respectively.

In which case, on two occasions, either target address register (46c''') or (46g''') in apparatus (12c'') then reads a single bit binary address in a parallel connection into the data input of each of the shift registers (64f), (64c), (64m), and (64g), which are illustrated in FIG. (4B), such that retrieved binary address bit (0) or binary address bit (1) is applied in a parallel connection to the data input of each of the shift registers (64f), (64c), (64m), and (64g), on each of two occasions, i.e., logic level (0) or logic level (1) is applied in a parallel connection to the data input of shift registers (64f), (64c), (64m), and (64g) on each of two occasions. Wherein, also, during each of the aforementioned comparisons, as master clock (16aa) clocks timer (82aa), timer (82aa) applies a pulse to the clock input of each of the comparison shift registers (64f) and (64m), and thus, in effect, the respectively retrieved binary sequence of addresses is written into both comparison shift registers (64f) and (64m) because of their respective write enabling input from timer (80aa);

3) Consequentially, in FIG. (4B), comparison shift register (64*f*) applies respective input to the data inputs of comparison latches (14*d*) and (14*f*), and comparison shift register (64*m*) applies respective input to the data inputs of comparison latches (14*h*) and (14*m*);

4) Then, as master clock (16*aa*) clocks timer (20*aa*), timer (20*aa*) is set, and consequentially applies a binary logic level (1) input to the clock input of each of the comparison latches (14*d*), (14*f*), (14*h*), and (14*m*), such that comparison latches (14*d*) and (14*f*) apply respective input to exclusive-nor gates (4*c*) and (4*f*), respectively; and comparison latches (14*h*) and (14*m*) apply respective input to exclusive-nor gates (4*g*) and (4*m*), respectively; and 5) Finally, then, in digital pulse measuring apparatus (8*aa*-B), the particular pattern sequences of binary addresses which are written into comparison shift registers (64*f*) and (64*m*) (which have the same sequence of addresses) are compared with the pattern sequences of binary addresses which were written into storage shift registers (64*c*) and (64*g*) in order to determine which stored sequence in memory is the best match according to the greatest number of binary addresses input in the same sequentially ordered pattern (by a process which is equivalent to the comparison stage in the pattern recognition process in the preferred embodiment which pertains to FIG. 2*a*). Wherein, the memory unit which is retrieved, i.e., memory unit (10*c*) or (10*g*) in FIG. (4B), then produces an output to a respective target, i.e., target (46*c*) or (46*g*) in FIG. (4B), in order to produce a respective result.

Another preferred embodiment of the present invention for pattern recognition is applied for storing and comparing sequences of sequences of data patterns. Wherein, a method of pattern recognition as such applies a pattern recognition process for storing and comparing small sequences of patterns, e.g., sequences of two data patterns, which are then applied for the pattern recognition of larger sequences of patterns which each comprise a plurality of smaller sequences.

Another preferred embodiment of the present invention which is applied for pattern recognition applies the steps which are described in the preferred embodiments which pertain to FIGS. (2*a*), (3A, 3B, and 3C), or (4A and 4B), or the equivalent, except that each pattern which is input for comparison is modified in terms of, for example, size, position, and/or rotation in order to achieve a significant match with respect to a pertinent stored pattern when the values of one or more of the parameters of the pattern input for comparison vary relative to an otherwise matching stored pattern in terms of, as in this example, size, position, and/or rotation. Wherein, each input pattern is modified in size, position, and/or rotation in graduated ways, and then each modified version is input for comparison. In which case, the comparison process is equivalent to the comparison process described in the preferred embodiment which pertains to FIG. (2*a*), or the equivalent, except that the measuring process produces an output according to a best matching collection of input patterns relative to the stored patterns.

Yet another preferred embodiment of the present invention which is applied for pattern recognition applies the steps which are described in the preferred embodiments which pertain to FIGS. (2*a*), (3A, 3B, and 3C), or (4A and 4B), or the equivalent, except that, in this case, the storage apparatus is modified such that each pattern is stored, for example, in different sizes, positions, and/or rotations in graduated ways, and these stored patterns are compared with one constant pattern which is input for comparison. Wherein, this preferred embodiment is also applied when the values of one or more of the parameters of a pattern input for comparison vary relative to an otherwise matching stored pattern in terms of, as in this example, size, position, and/or rotation. However, this preferred embodiment is more time conscious while the foregoing preferred embodiment which modifies the input pattern for comparison with a plurality of unmodified stored patterns is more space conscious.

Still yet another preferred embodiment of the present invention which is applied for pattern recognition is different by storing and comparing sequences of combinations of data patterns. Wherein, in such a process, a combination based pattern recognition process produces outputs of combinations of addresses in a series, in which case each combination is produced by a process of pattern recognition which is equivalent to the combination-based pattern recognition process described previously in the preferred embodiment which pertains to FIGS. (3A), (3B), and (3C). Then, the series of address combinations are input into apparatus for storing and comparing sequences of combinations of data patterns in a pattern recognition process which is equivalent to the sequence-based pattern recognition process described previously in the preferred embodiment which pertains to FIGS. (4A) and (4B).

Even still yet another preferred embodiment of the present invention applies a two-dimensional array of interconnected exclusive-nor gates for pattern recognition by a process which is otherwise equivalent to the pattern recognition process which is applied in the preferred embodiment which pertains to FIG. (2*a*).

While in still yet even other preferred embodiments, the present invention proposes to be applicable for medical purposes such as for replacing or augmenting a portion of brain or spinal cord tissue (wherein, in the later case, for example, operating as a spinal cord bridge). In this case, a method of pattern recognition could be applied for replacing a portion of the brain or spinal cord, such that apparatus of one such method would interface with neurological tissue by way of electrodes to obtain input from neurons at one end, and then after matching the input pattern, or sequence of input patterns, of neurological signals, apparatus would deliver output in the form of neurological signals by way of electrodes at the other end to a respective neurological target (or to respective neurological targets). Moreover, the method of the present invention could be aggregated to operate in two directions as well (e.g., for spinal cord applications). While, still other preferred embodiments of the present invention could similarly be constructed for medical purposes, for example, for interfacing neurological tissue with the external environment.

Notes: 1) Exclusive-nor gates are initially active when both inputs have the absence of electrical input applied or both inputs have the presence of electrical input applied. So, when relevant, a blank pattern, i.e., a pattern with all binary logic level (0) inputs applied, or the converse, i.e., a pattern with all binary logic level (1) inputs applied, which, in either case, could be a precondition of a storage process before a storage process is initiated, should not be misinterpreted as a pattern match in a preferred embodiment where a clocking process of some sort does not control the storage and comparison processes; and 2) Certain apparatus comprising, for example, power supply apparatus, are not illustrated.

To broaden, the detailed description of the present invention herein describes a limited number of the embodiments of the present invention. Yet, various other embodiments of the present invention can be included in the scope of the present invention. Thus, the present invention should be interpreted in as broad a scope as possible so as to include all of the equivalent embodiments of the present invention.

I claim:

1. Method of pattern recognition comprising the steps of:
   1) inputting a pattern of data with the application of input selected from the group consisting of the presence of electrical input comprising a binary logic level 1 input and the absence of electrical input comprising a binary logic level 0 input into one input of each of at least two exclusive-nor logic circuits, wherein a pattern of data is stored;
   2) inputting a pattern of data for comparison with the stored pattern of data with the application of input selected from the group consisting of the presence of electrical input comprising a binary logic level 1 input and the absence of electrical input comprising a binary logic level 0 input into the other input of each of the exclusive-nor logic circuits, wherein each exclusive-nor circuit produces output selected from the group consisting of the presence of electrical output comprising a binary logic level 1 output when both inputs have the same datum input and the absence of electrical output comprising a binary logic level 0 output when both inputs have different datum input; and
   3) measuring the outputs of the exclusive-nor logic circuits collectively with a measuring apparatus, wherein the percentage of the pattern of data input for comparison which matches the pattern of data stored in the exclusive-nor circuits is directly proportional to the magnitude of the collective output of the exclusive-nor circuits.

* * * * *